(12) United States Patent
Lee et al.

(10) Patent No.: US 11,855,672 B2
(45) Date of Patent: Dec. 26, 2023

(54) DYNAMIC RFPA OPERATING MODES FOR A CONVERGED COMMUNICATION DEVICE

(71) Applicant: MOTOROLA SOLUTIONS, INC., Chicago, IL (US)

(72) Inventors: Wai Mun Lee, Perak (MY); Hui Boon Chua, Johor (MY); Alexander Oon, Penang (MY); Kee Sin Thong, Penang (MY); Soon Leng Yap, Perak (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 137 days.

(21) Appl. No.: 17/651,302

(22) Filed: Feb. 16, 2022

(65) Prior Publication Data

US 2023/0261681 A1   Aug. 17, 2023

(51) Int. Cl.

| H04B 1/04 | (2006.01) |
|---|---|
| H04B 1/00 | (2006.01) |
| H04B 1/16 | (2006.01) |
| H04B 1/44 | (2006.01) |

(52) U.S. Cl.
CPC .......... *H04B 1/1615* (2013.01); *H04B 1/006* (2013.01); *H04B 1/44* (2013.01)

(58) Field of Classification Search
CPC ...... H04B 1/005; H04B 1/0053; H04B 1/006; H04B 1/04; H04B 1/1615; H04B 1/40; H04B 1/401; H04B 1/44; H04B 2001/0408; H04B 2001/0416
See application file for complete search history.

(56) References Cited

U.S. PATENT DOCUMENTS

| 8,078,119 B2 | 12/2011 | Gorbachov | |
|---|---|---|---|
| 8,102,205 B2 * | 1/2012 | Pletcher | H03F 3/195 330/51 |
| 8,634,782 B2 * | 1/2014 | Asuri | H04B 1/0483 455/552.1 |
| 9,887,673 B2 * | 2/2018 | Park | H04B 1/04 |
| 10,211,861 B2 * | 2/2019 | Vaillancourt | H04B 1/0458 |
| 10,666,200 B2 * | 5/2020 | Gebeyehu | H04B 1/04 |

FOREIGN PATENT DOCUMENTS

WO   2004054095 A1   6/2004

* cited by examiner

*Primary Examiner* — Quochien B Vuong
(74) *Attorney, Agent, or Firm* — Michael Best & Friedrich LLP (57) ABSTRACT

A converged device with dual RFPA technology for a dynamic switchable mode. One example provides a communication device comprising a RF transmitter system and a controller. The RF transmitter system includes a plurality of RFPAs, each RFPA having a biasing system and outputting an output signal, and a summing junction, wherein the output signal of each RFPA are combined to form an output RF transmitter signal. The controller is configured to control the biasing state of each biasing system to a nominal bias state for a first mode of the communication device. The controller is configured to control a first plurality of offset voltages applied to each biasing system for a second mode of the communication device. The controller is configured to control a second plurality of offset voltages applied to each biasing system for a third mode of the communication device.

20 Claims, 5 Drawing Sheets

DYNAMIC RFPA OPERATING MODES FOR A CONVERGED COMMUNICATION DEVICE

BACKGROUND OF THE INVENTION

Wireless communication devices transfer information using various communication protocols and techniques. To satisfy the needs of a particular communication system or user, a wireless communication device may be a converged device capable of providing communications via multiple communication protocols. Such protocols may include, for example, cellular communication protocols such as Long-Term Evolution (LTE), Land Mobile Radio (LMR) protocols, or other wireless communications protocols.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate examples, instances, and/or aspects of concepts that include the claimed subject matter, and explain various principles and advantages of examples, instances, and/or aspects.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples.

The apparatus and method components have been represented where appropriate by conventional symbols in the drawings, showing only those specific details that are pertinent to understanding the examples, instances, and aspects illustrated so as not to obscure the disclosure with details that will be readily apparent to those of ordinary skill in the art having the benefit of the description herein.

DETAILED DESCRIPTION OF THE INVENTION

A converged wireless communication device (for example, a converged device) is a device capable of communicating within multiple communication systems implementing different communication protocols. For example, a converged device may communicate in both a Land Mobile Radio (LMR) communication system and a Long-Term Evolution (LTE) communication system. While LMR and LTE are provided as two primary examples throughout the disclosure, other communication protocols may be implemented such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ESI, LTE-Advanced or LTE-Advanced Pro compliant with, for example, the 3GPP TS 36 specification series, or the 5G (including a network architecture compliant with, for example, the 3GPP TS 23 specification series and a new radio (NR) air interface compliant with the 3GPP TS 38 specification series) standard, among other possibilities.

When both an LMR (for example, a first communication protocol) transmission event and an LTE (for example, a second communication protocol) transmission event occur simultaneously in a converged device, the respective carriers generate an intermodulation (IM) product. The IM product may cause degradation in LMR or LTE sensitivity when the IM product is within the opposing LMR or LTE downlink frequency. The IM product may also cause noise within the LMR or LTE transmission due to the close proximity of their communication bands (for example, frequency bands). Additionally, LMR communication generates harmonic frequencies (for example, second harmonics and third harmonics) that cause degradation of LTE receiving sensitivity. Accordingly, there is a need to improve the intermodulation product and/or harmonic frequencies of LMR and LTE communication within a converged device.

Examples described herein provide, among other things, a converged device utilizing dual radio frequency power amplifier (RFPA) technology for a dynamic switchable mode (for example, a biasing change, a tuning change, and the like). The dynamic switchable mode is independently provided to each RFPA of parallel RFPAs. When simultaneously communicating with two or more communications protocols, the processor (or processors) of the converged device may determine which frequency both protocols are operating within. The mode of the respective parallel RFPA is then set to achieve a different mode of operation based on the operating frequencies. The modes may be configured for different efficiencies, such as a general efficiency of the system, an improved harmonics of the system, or an improved transmission IM product of the system.

One example provides a communication device comprising a radio frequency (RF) transmitter system and a controller connected to the RF transmitter system. The RF transmitter system includes a plurality of RF power amplifiers (RFPAs). Each RFPA has a biasing system and outputs an output signal. The transmitter also has a summing junction, where the output signal of each RFPA are combined to form an output RF transmitter signal. Each biasing system is configured to be independently adjusted to produce a biasing state based on an operating mode of the communication device and control of each biasing system adjusts the output RF transmitter signal. The controller is configured to control the biasing state of each biasing system to a nominal bias state for a first mode of the communication device. The controller is also configured to control a first plurality of offset voltages applied to each biasing system relative to the nominal bias state for a second mode of the communication device, where the second mode modifies a harmonic of the output RF transmitter signal relative to the first mode. The controller is configured to control a second plurality of offset voltages applied to each biasing system relative to the nominal bias state for a third mode of the communication device, where the third mode modifies intermodulation of the output RF transmitter signal relative to the first mode.

Another example provides a method for operating a converged communication device. The method includes controlling a biasing state of each of a plurality of biasing systems to a nominal bias state for a first mode of the converged communication device, where each biasing system is coupled to a respective radio frequency power amplifier (RFPA), and each RFPA outputs an output signal. The method also includes combining the output signal of each RFPA at a summing junction to form an output radio frequency (RF) transmitter signal. Each biasing system is configured to be independently adjusted to produce a biasing state based on an operating mode of the converged communication device. Control of each biasing system adjusts the output RF transmitter signal. The method also includes controlling a first plurality of offset voltages applied to each biasing system relative to the nominal bias state for a second mode of the converged communication device, where the second mode modifies a harmonic of the output RF transmitter signal relative to the first mode. The method also includes controlling a second plurality of offset voltages applied to each biasing system relative to the nominal bias state for a third mode of the communication device, where the third mode modifies intermodulation of the output RF transmitter signal relative to the first mode.

Figure 1:
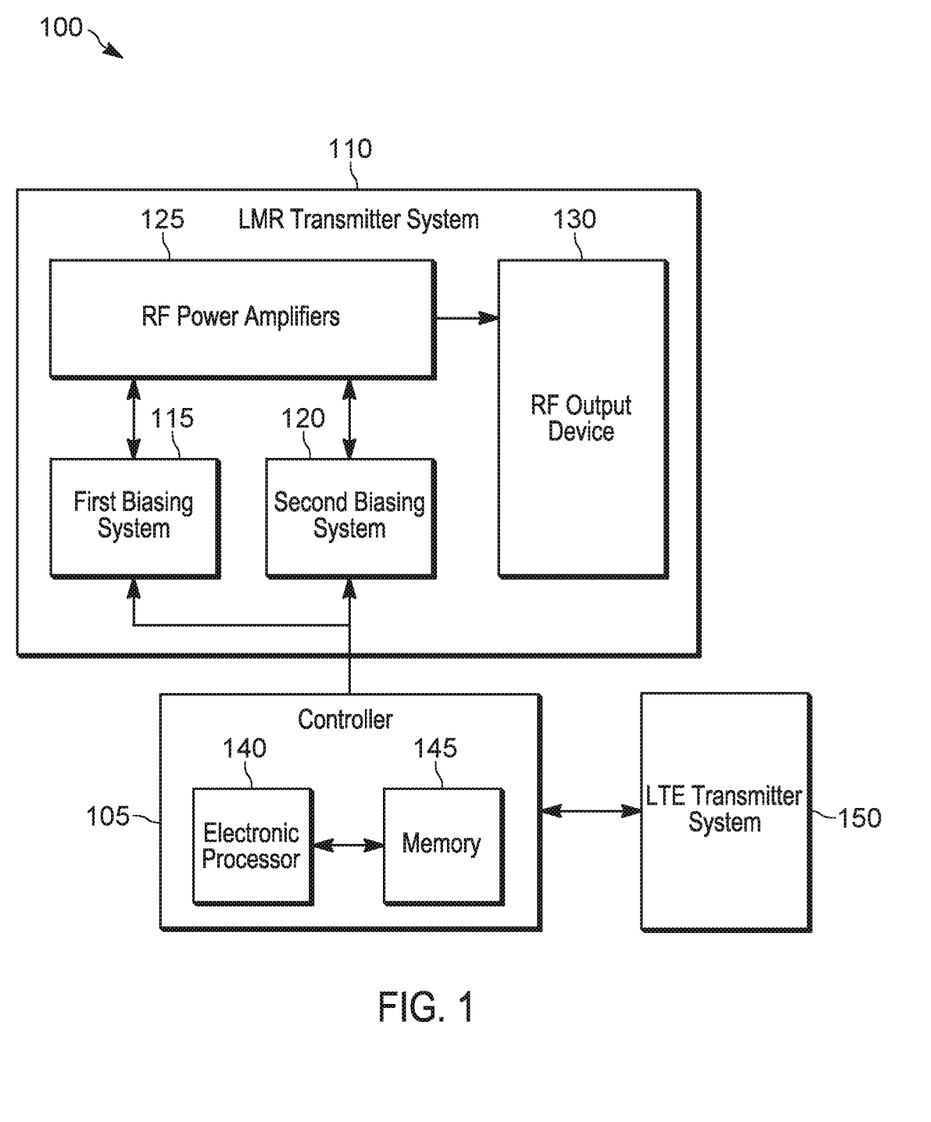
FIG. 1 is a block diagram of a control system for a converged device, according to one example.

FIG. 1 illustrates a control system 100 for a converged device according to one example. In the example illustrated, the control system 100 includes a controller 105, an LMR transmitter system 110, and an LTE transmitter system 150. The controller 105 is configured to control the LTE transmitter system 150 to transmit LTE signals via a communication medium. The LTE transmitter system 150 may include, for example, an antenna, a transceiver, or other components to facilitate LTE communication. The controller 105 is also configured to control the LMR transmitter system 110 to transmit LMR signals via a communication medium. In some examples, the LTE transmitter system 150 includes a separate controller (or another electronic device) configured to control LTE communication.

In the example shown, the controller 105 includes an electronic processor 140 (for example, a microprocessor or another electronic device) and a memory 145. The memory 145 may include read only memory (ROM), random access memory (RAM), other non-transitory computer-readable media, or a combination thereof. The electronic processor 140 is configured to retrieve instructions from the memory 145 and execute, among other things, the retrieved instructions to control the operation of the LMR transmitter system 110 and the LTE transmitter system 150. In certain instances, the electronic processor 140 executes instructions stored in the memory 145 to perform methods described herein.

The LMR transmitter system 110 includes a first biasing system 115, a second biasing system 120, RF power amplifiers 125, and an RF output device 130. The first biasing system 115 and the second biasing system 120 may include a plurality of electronic components, such as switches, capacitors, inductors, and resistors that are adjusted to produce a biasing state for a connected RF power amplifier. The RF output device 130 may include, for example, an antenna, a transceiver, or other components to facilitate LMR communication. As described in more detail below, the controller 105 controls offset voltages applied to the first biasing system 115 and the second biasing system 120. These, in turn, adjust the bias of the RF power amplifiers 125, and change an operating mode of the LMR transmitter system 110.

The control system 100 illustrated in FIG. 1 is a generalized version of a control system for a converged device.

Figure 2:
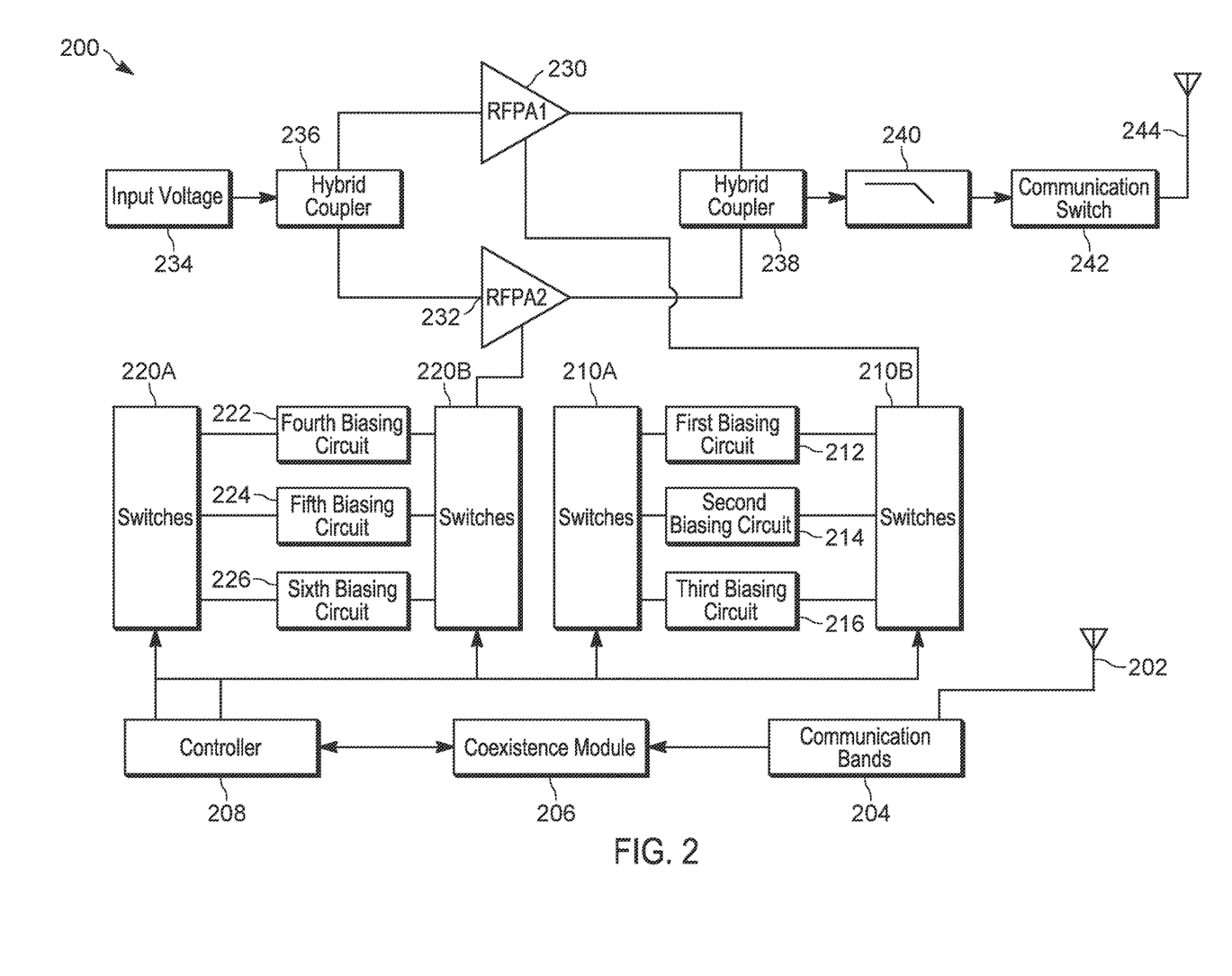
FIG. 2 is a block diagram of a control system for a converged device, according to another example.

FIG. 2 illustrates another, more specific example of a control for a converged device, which in the example provided is control system 200.

In the example shown, the control system 200 includes a first antenna 202, a plurality of communication bands 204, a coexistence module 206, and a controller 208. In some examples, the controller 208 is, or functions similarly to, the controller 105 from FIG. 1. The first antenna 202 is configured to communicate via a first communication protocol, such as LTE, within one of the plurality of communication bands 204. For example, the first communication protocol may be an LTE communication protocol, and plurality of communication bands 204 are LTE bands (for example, B2, B3, B5, B8, B13, B14, B20, and B39). The coexistence module 206 is configured to determine which band the first antenna 202 is operating in. In some examples, the coexistence module 206 and the first antenna 202 form the LTE transmitter system 150 of FIG. 1. In other examples, the coexistence module 206 is part of the controller 208. For example, the controller 208 may determine which band the first antenna 202 is operating in.

In one instance, the control system 200 includes a first set of switches 210 (which includes a first switching array 210A and a second switching array 210B) and a second set of switches 220 (which includes a third switching array 220A and a fourth switching array 220B). The first set of switches 210 is configured to control a biasing state of a first RF power amplifier 230, and the second set of switches 220 is configured to control a biasing state of a second RF power amplifier 232. The first set of switches 210 are coupled to a first plurality of biasing circuits, including a first biasing circuit 212, a second biasing circuit 214, and a third biasing circuit 216. A biasing state of the first RF power amplifier 230 is controlled by setting a configuration of the first biasing circuit 212, the second biasing circuit 214, the third biasing circuit 216, or a combination thereof. Additionally, the second set of switches 220 are coupled to a second plurality of biasing circuits, including a fourth biasing circuit 222, a fifth biasing circuit 224, and a sixth biasing circuit 226. A biasing state of the second RF power amplifier 232 is controlled by setting a configuration of the fourth biasing circuit 222, the fifth biasing circuit 224, the sixth biasing circuit 226, or a combination thereof.

The first set of switches 210 and the second set of switches 220 may each include interlock switches, transistors, converters configured to generate voltages, or other devices capable of electrical switching. Each biasing circuit (for example, the first biasing circuit 212, the second biasing circuit 214, the third biasing circuit 216, the fourth biasing circuit 222, the fifth biasing circuit 224, and the sixth biasing circuit 226) includes one or more resistors, inductors and capacitors. In some examples, the resistors, the inductors, the capacitors, or a combination thereof are capable of being tuned to specific values.

In the example shown, an output of the first set of switches 210, illustrated as an output of the second switching array 210B, is provided as a biasing voltage to the first RF power amplifier 230. An output of the second set of switches 220, illustrated as an output of the fourth switching array 220B, is provided as a biasing voltage to the second RF power amplifier 232. The first RF power amplifier 230 and the second RF power amplifier 232 are coupled in parallel. The control system 200 also includes an input voltage source 234 provided as an input voltage to the first RF power amplifier 230 and the second RF power amplifier 232. A first hybrid coupler 236 splits the input voltage source 234 into two separate input voltages, one for each RF power amplifier 230, 232. The phase of the input voltages provided to each RF power amplifier 230, 232 are separated by 90 degrees. For example, if the phase of the input voltage provided to the first RF power amplifier 230 is 0 degrees, the phase of the input voltage provided to the second RF power amplifier 232 is 90 degrees.

In the example shown, the output of the first RF power amplifier 230 and the output of the second RF power amplifier 232 are combined by a second hybrid coupler 238 (for example, a summing junction) into a single output signal. In some examples, a filter 240 is applied to the output signal to reduce a harmonics level of the output signal. A communication switch 242 is then controlled to output the output signal via a second antenna 244. The second antenna 244 is configured to communicate via a second communication protocol, such as LMR communication.

By controlling the first set of switches 210 and the second set of switches 220 to set specific configurations of the biasing circuits, the controller 208 is capable of setting an operating mode of the converged device. Table 1 provides a plurality of possible operating modes of the converged device based on the biasing provided to the first RF power amplifier 230 and the second RF power amplifier 232. While five modes are provided, these modes are merely examples, and more or fewer modes may also be present.

TABLE 1

Dual RF Power Amplifier Modes of Operation

| Mode Number | First RF Power Amplifier Biasing | Second RF Power Amplifier Biasing | Mode Intention |
| --- | --- | --- | --- |
| Mode 1 | Default | Default | Increased LMR Tx Efficiency |
| Mode 2 | Default | Low Bias | Increased $2^{nd}$ Harmonics |
| Mode 3 | Default | High Bias | Increased Intermodulation |
| Mode 4 | Low Bias | Default | Increased $3^{rd}$ Harmonics |
| Mode 5 | High Bias | Default | Increased Intermodulation |

As seen in Table 1, mode 1 (for example, the first mode) is configured for LMR transmission efficiency, mode 2 (for example, the second mode) is configured for second harmonics inter-band coexistence, and mode 3 (for example, the third mode) is configured for intra-band transmission intermodulation co-existence, among other modes.

Figure 3:
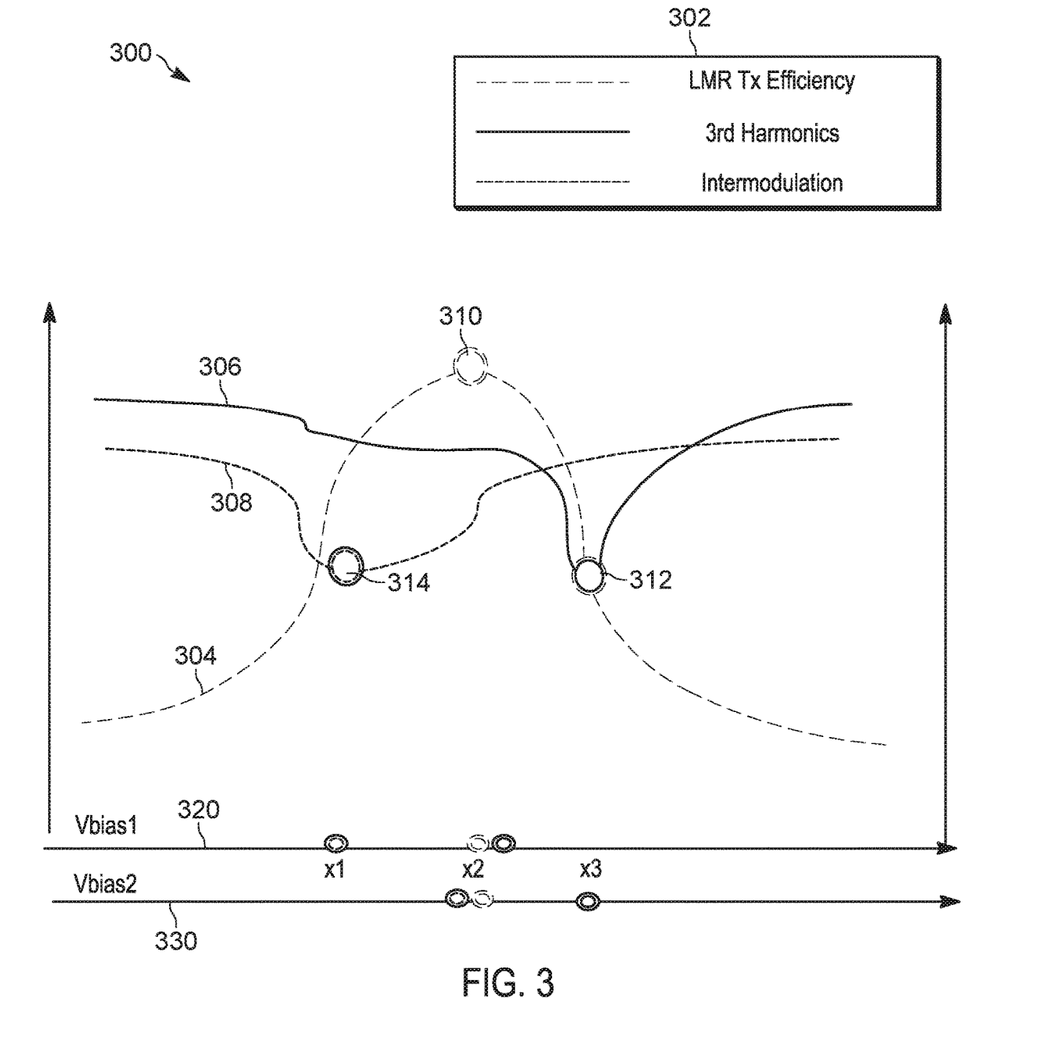
FIG. 3 is a graph providing operating characteristics of the converged device of FIGS. 1 and 2, according to some examples.

FIG. 3 illustrates a graph 300 providing the LMR transmission efficiency, second harmonics inter-band coexistence, and intra-band transmission intermodulation co-existence of the converged device in different operating modes (see legend 302), according to one example. Specifically, first function 304 provides the LMR transmission efficiency, second function 306 provides the second harmonics interband coexistence, and third function 308 provides the intra-band transmission intermodulation co-existence. A y-axis 340 provides the RF amplitude (in dB).

Graph 300 includes a first x-axis 320 providing values corresponding to the biasing voltage provided to the first RF power amplifier 230 (Vbias1) and a second x-axis 330 providing values corresponding to the biasing voltage provided to the second RF power amplifier 232 (Vbias2) for each operating mode. For example, when in mode 1, Vbias1 and Vbias2 are both at value ×2 (for example, a default value). When in mode 2, Vbias1 is approximately at value ×2, and Vbias2 is at value ×3 (for example, a high bias). When in mode 3, Vbias1 is approximately at value ×1 (for example, a low bias), and Vbias2 is at ×2. These modes are merely examples. Other modes and biasing values may be implemented.

As described with respect to Table 1, each operating mode of the converged device helps achieve a different goal. In the example of FIG. 3, when in mode 1, the values of the first RF power amplifier 230 and the second RF power amplifier 232 are selected to increase the LMR transmission efficiency (at point 310). When in mode 2, the values of the first RF power amplifier 230 and the second RF power amplifier 232 are selected to reduce the second harmonics inter-band coexistence (at point 312). When in mode 3, the values of the first RF power amplifier 230 and the second RF power amplifier 232 are selected to reduce the intra-band transmission intermodulation co-existence (at point 314).

Figure 4:
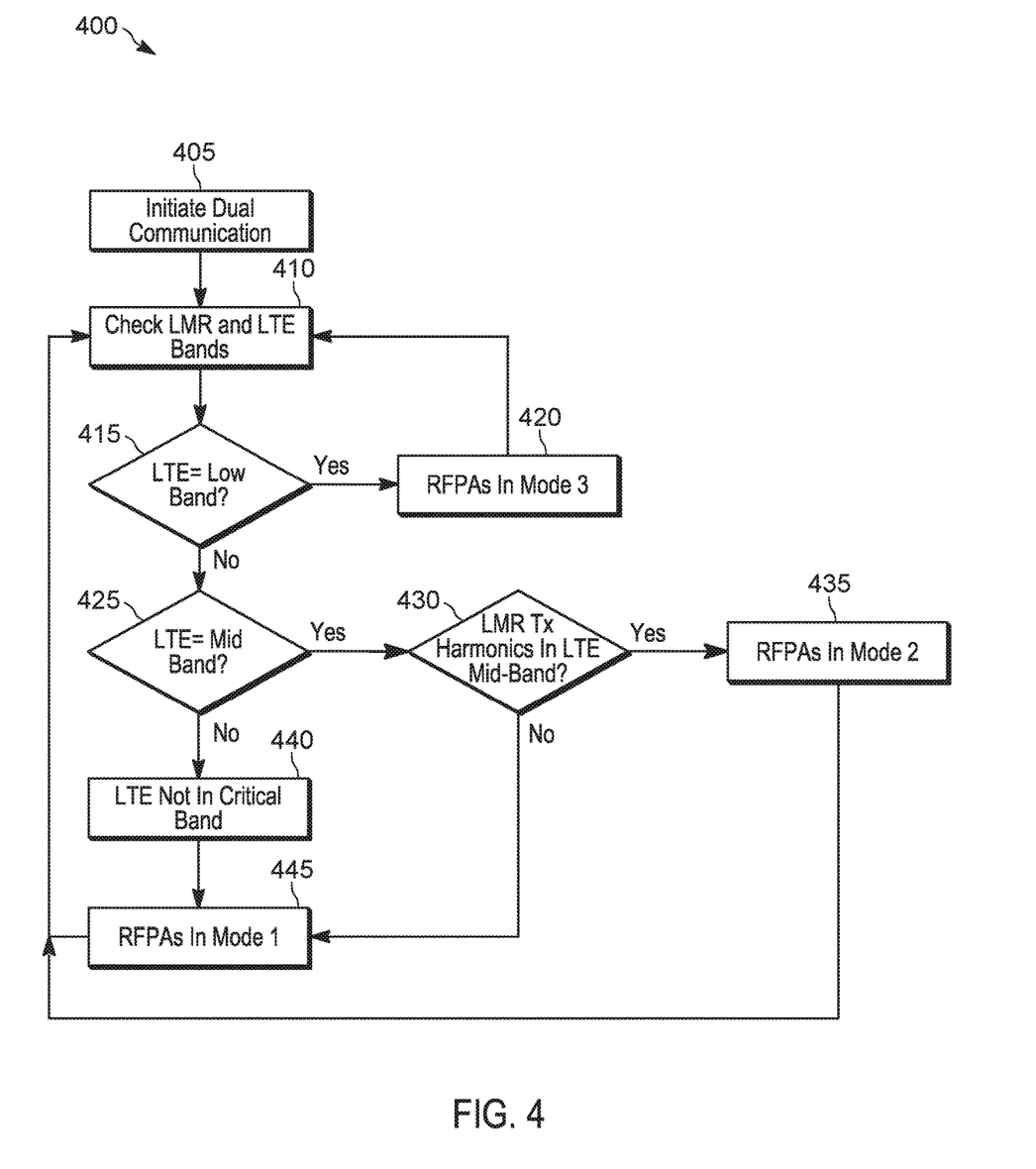
FIG. 4 is a block diagram of a method performed by the converged device of FIGS. 1 and 2, according to some examples.

FIG. 4 illustrates one example method 400 of selecting an operating mode for the converged device. The method 400 is described as being executed by the controller 208. However, in some examples, aspects of the method 400 is performed by another device. For example, the method 400 may be performed by the controller 208 in conjunction with the coexistence module 206.

In the example shown, at block 405, the controller 208 initiates dual communication of the converged device. For example, the controller 208 initiates communication using both an LTE communication protocol and an LMR communication protocols simultaneously. At block 410, the controller 208 determines the LMR operating band and the LTE operating band. The LMR band may be, for example, a Very High Frequency (VHF) band, an Ultra High Frequency (UHF) band, a range of 762 MHz-776 MHz, a range of 792-825 MHz, a range from 851-870 MHz, a range from 799-806 MHz, a range from 851-870 MHz, a range from 806 MHz-825 MHz, a range from 896 MHz-902 MHz, a range from 935 MHz-941 MHz, or the like. The LTE operating band may be, for example, B5, B8, B12, B13, B14, B3, B39, B41, B38, B7.

At block 415, the controller 208 determines whether the LTE band is in a low operating band range (such as, for example, B5, B8, or B20). If the LTE band is in a low operating band range (for example, a low-band range), the controller 208 proceeds to block 420 and operates the converged device in mode 3 (for example, the third operating mode). In some examples, to operate in mode 3, the controller 208 controls the first set of switches 210 to adjust the first biasing circuit 212 to an OFF state, the second biasing circuit 214 to an OFF state, and the third biasing circuit 216 to an ON state. Additionally, the controller 208 controls the second set of switches 220 to adjust the fourth biasing circuit 222 to an OFF state, the fifth biasing circuit 224 to an OFF state, and the sixth biasing circuit 226 to an ON state. Such a configuration applies a DEFAULT biasing voltage (for example, no biasing) to the first RF power amplifier 230 and a HIGH biasing voltage (with respect to the DEFAULT biasing voltage) to the second RF power amplifier 232. In some examples, the configuration also applies a biasing voltage to the first RF power amplifier 230. The controller 208 then returns to block 410 to monitor whether the LMR operating band and/or the LTE operating band change.

If, at block 415, the controller 208 determines the LTE band is not in a low operating band range, the controller proceeds to block 425. At block 425, the controller 208 determines whether the LTE band is in a mid operating band range (such as, for example, B2, B3, or B39). If the LTE band is in a mid operating band range (for example, a mid-band range), the controller 208 proceeds to block 430.

At block 430, the controller 208 determines whether the LMR transmission harmonics (indicated by the LMR operating band) interfere with the LTE operating band. As one example, if the LTE operating band is B3 and the LMR band is 935 MHz-941 MHz, the LTE operating band and the LMR operating band have an interference.

If the LMR transmission harmonics do interfere with the LTE operating band, the controller 208 proceeds to block 435 and operates the converged device in mode 2 (for example, the second operating mode). In some examples, to operate in mode 2, the controller 208 controls the second set of switches 210 to adjust the first biasing circuit 212 to an OFF state, the second biasing circuit 214 to an ON state, and the third biasing circuit 216 to an OFF state. Additionally, the controller 208 controls the second set of switches 220 to adjust the fourth biasing circuit 222 to an OFF state, the fifth biasing circuit 224 to an ON state, and the sixth biasing circuit 226 to an OFF state. Such a configuration applies a DEFAULT biasing voltage (for example, no biasing) to the first RF power amplifier 230 and a LOW biasing voltage (with respect to the DEFAULT biasing voltage) to the second RF power amplifier 232. In some examples, the configuration also applies a biasing voltage to the first RF power amplifier 230. The controller 208 then returns to block 410 to monitor whether the LMR operating band and/or the LTE operating band change.

If, at block 425, the controller 208 determines the LTE band is not in a mid operating band range, the controller 208 proceeds to block 440. At block 440, the controller 208 determines the LTE band is in a non-critical band range (for example, determines the LTE band is not in the low operating band range or the mid operating band range). The controller 208 then proceeds to block 445. Additionally, if, at block 430, the controller 208 determines the LMR transmission harmonics do not interfere with the LTE operating band, the controller 208 proceeds to block 445.

At block 445, the controller 208 operates the converged device in mode 1 (for example, the first operating mode). In some examples, to operate in mode 1, the controller 208 controls the second set of switches 210 to adjust the first biasing circuit 212 to an ON state, the second biasing circuit 214 to an OFF state, and the third biasing circuit 216 to an OFF state. Additionally, the controller 208 controls the second set of switches 220 to adjust the fourth biasing circuit 222 to an ON state, the fifth biasing circuit 224 to an OFF state, and the sixth biasing circuit 226 to an OFF state. Such a configuration applies a DEFAULT biasing voltage (for example, no biasing) to both the first RF power amplifier 230 and the second RF power amplifier 232. The controller 208 then returns to block 410 to monitor whether the LMR operating band and/or the LTE operating band change. The controller 208 monitors the LMR operating band and the LTE operating band. When the LMR operating band and/or the LTE operating band changes, the controller 208 changes the operating mode.

Figure 5:
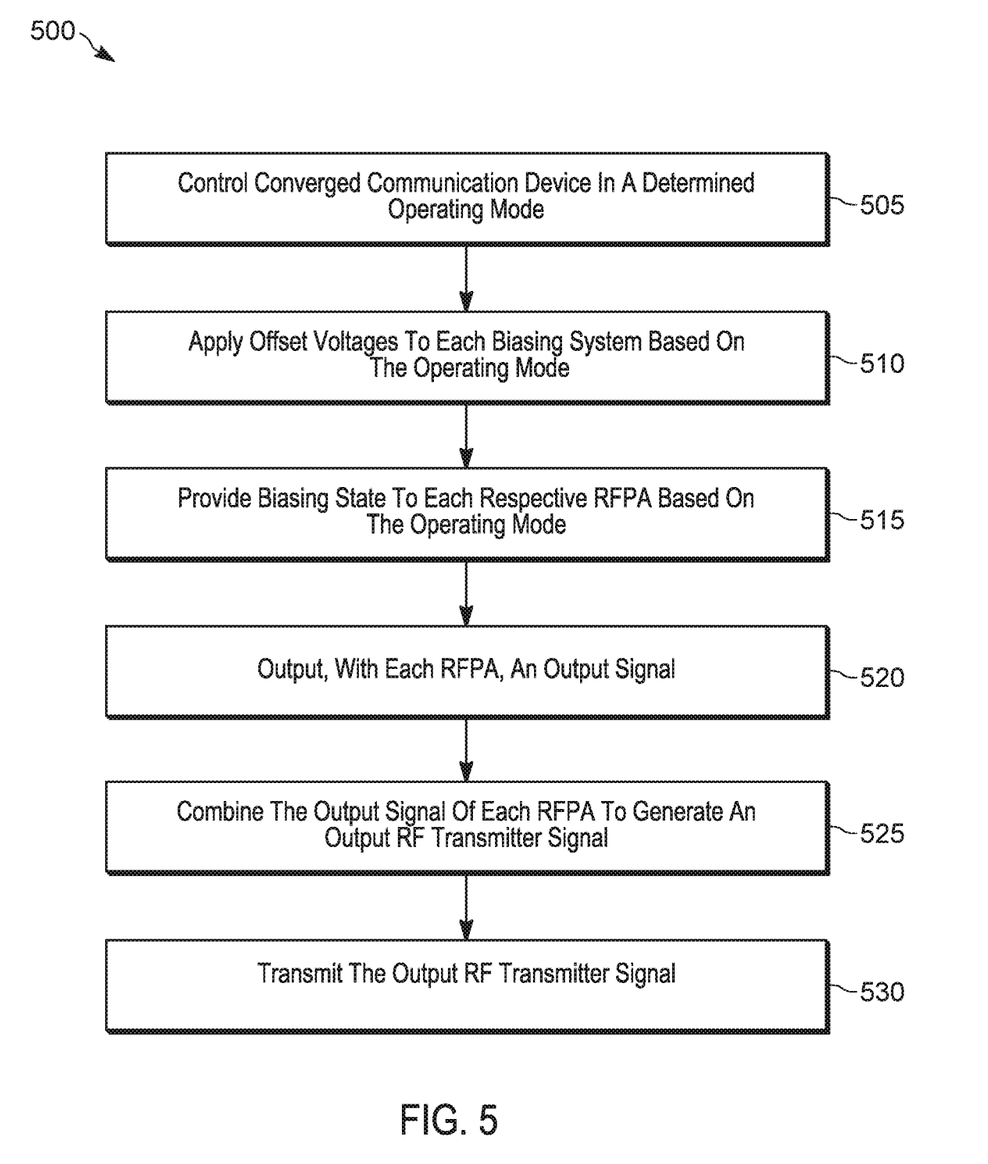
FIG. 5 is a block diagram of another method performed by the converged device of FIGS. 1 and 2, according to some examples.

FIG. 5 illustrates one example method 500 of operating the converged communication device. The method 500 is described as being executed by the controller 208. However, in some examples, aspects of the method 500 is performed by another device. For example, the method 500 may be performed by the controller 208 in conjunction with the coexistence module 206, the first set of switches 210, the second set of switches 220, the first RF power amplifier 230, the second RF power amplifier 232, the second hybrid coupler 238, the communication switch 242, or a combination thereof.

At block 505, the controller 208 controls the converged communication device in a determined operating mode. For example, the controller 208 controls the converged communication device in either mode 1, mode 2, or mode 3, as determined by the controller 208 in method 400. At block 510, the controller 208 applies offset voltages to each biasing system based on the operating mode. For example, when in mode 1, the controller 208 controls the first set of switches 210 and the second set of switches 220 to a nominal bias state (for example, a default state). When in mode 2, the controller 208 applies a first plurality of offset voltages to the first set of switches 210 and the second set of switches 220 relative to the nominal bias state. When in mode 3, the controller 208 applies a second plurality of offset voltages to the first set of switches 210 and the second set of switches 220 relative to the nominal bias state. The first plurality of offset voltages may control the first set of switches 210 and the second set of switches 220 as described with respect to block 435 of FIG. 4. The second plurality of offset voltages may control the first set of switches 210 and the second set of switches 220 as described with respect to block 420 of FIG. 4.

At block 515, the first set of switches 210 and the second set of switches 220 provide a biasing state to the first RF power amplifier 230 and the second RF power amplifier 232, respectively. The biasing state is based on the operating mode of the converged communication device. For example, with reference to Table 1, when in mode 1, the first set of switches 210 provides a DEFAULT (for example, a nominal bias) biasing voltage to the first RF power amplifier 230 and the second set of switches 220 provides a DEFAULT voltage to the second RF power amplifier 232. When in mode 2, the first set of switches 210 provides a DEFAULT voltage to the first RF power amplifier 230 and the second set of switches 220 provides a LOW biasing voltage (with respect to the DEFAULT biasing voltage) to the second RF power amplifier 232. When in mode 3, the first set of switches 210 provides a DEFAULT biasing voltage to the first RF power amplifier 230 and the second set of switches 220 provides a HIGH biasing voltage (with respect to the DEFAULT biasing voltage) to the second RF power amplifier 232.

At block 520, the first RF power amplifier 230 and the second RF power amplifier 232 both output an output signal. Each respective output signal is based on the biasing voltage provided by the first set of switches 210 and the second set of switches 220. At block 525, the second hybrid coupler 238 (for example, the summing junction) combines the output signals of the first RF power amplifier 230 and the second RF power amplifier 232 to generate an output RF transmitter signal (for example, the output signal). At block 530, the communication switch 242 transmits the output RF transmitter signal using the second antenna 244.

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

We claim:

1. A communication device comprising:
   a radio frequency (RF) transmitter system including:
      a plurality of RF power amplifiers (RFPAs), each RFPA having a biasing system and outputting an output signal; and
      a summing junction, wherein the output signal of each RFPA are combined to form an output RF transmitter signal,
      wherein each biasing system is configured to be independently adjusted to produce a biasing state based on an operating mode of the communication device, and wherein control of each biasing system adjusts the output RF transmitter signal, and
   a controller connected to the RF transmitter system and configured to:
      control the biasing state of each biasing system to a nominal bias state for a first mode of the communication device;
      control a first plurality of offset voltages applied to each biasing system relative to the nominal bias state for a second mode of the communication device, the second mode modifying a harmonic of the output RF transmitter signal relative to the first mode; and
      control a second plurality of offset voltages applied to each biasing system relative to the nominal bias state for a third mode of the communication device, the third mode modifying intermodulation of the output RF transmitter signal relative to the first mode.

2. The communication device of claim 1, wherein:
   the first mode is configured for land mobile radio (LMR) transmission efficiency;
   the second mode is configured for second harmonics inter-band co-existence; and
   the third mode is configured for intra-band transmission intermodulation co-existence.

3. The communication device of claim 1, wherein the RF transmitter system further includes:
   a first hybrid coupler coupled to a first input of each RFPA, the first hybrid coupler configured to separate a phase of each RFPA by 90 degrees.

4. The communication device of claim 1, wherein the controller is further configured to:
   detect an operating frequency of a Long-Term Evolution (LTE) operating band;
   control, in response to the operating frequency of the LTE operating band being within a non-critical band range, the biasing state of each biasing system for the first mode of the communication device;
   control, in response to the operating frequency of the LTE operating band being within a mid-band range, the biasing state of each biasing system for the second mode of the communication device; and control, in response to the operating frequency of the LTE operating band being within a low-band range, the biasing state of each biasing system for the third mode of the communication device.

5. The communication device of claim 4, wherein the controller is further configured to:

detect an operating frequency of a land mobile radio (LMR) operating band;

determine, in response to the operating frequency of the LTE operating band being in the mid-band range, whether harmonics of the operating frequency of the LMR operating band are within the mid-band range;

control, in response to the harmonics of the operating frequency of the LMR operating band being within the mid-band range, the biasing state of each biasing system for the second mode of the communication device; and control, in response to the harmonics of the operating frequency of the LMR operating band not being within the mid-band range, the biasing state of each biasing system for the third mode of the communication device.

6. The communication device of claim 4, wherein the mid-band range is a B2 LTE band, a B3 LTE band, or a B39 LTE band, and wherein the low-band range is a B5 LTE band, a B8 LTE band, or a B20 LTE band.

7. The communication device of claim 1, wherein each biasing system includes one or more tunable resistors, and wherein the controller is configured to set a resistance value of each of the one or more tunable resistors to control the biasing state of each biasing system.

8. The communication device of claim 1, wherein the plurality of RFPAs includes a first RFPA and a second RFPA, and wherein controlling the first plurality of offset voltages applied to each biasing system for the second mode of the communication device includes applying a lower offset voltage to the biasing system for the second RFPA relative to the nominal bias state.

9. The communication device of claim 1, wherein the plurality of RFPAs includes a first RFPA and a second RFPA, and wherein controlling the second plurality of offset voltages applied to each biasing system for the third mode of the communication device includes applying a greater offset voltage to the biasing system for the second RFPA relative to the nominal bias state.

10. The communication device of claim 1, wherein the controller is further configured to:

control a third plurality of offset voltages applied to each biasing system relative to the nominal bias state for a fourth mode of the communication device, the fourth modifying a second harmonic of the output RF transmitter signal relative to the first mode; and control a fourth plurality of offset voltages applied to each biasing system relative to the nominal bias state for a fifth mode of the communication device, the fifth mode modifying second intermodulation of the output RF transmitter signal relative to the first mode.

11. A method for operating a converged communication device, the method comprising:

controlling the converged communication device in a first operating mode, a second operating mode, and a third operating mode, when in the first operating mode, controlling a biasing state of each of a plurality of biasing systems to a nominal bias state, when in the second operating mode, applying a first plurality of offset voltages to each biasing system relative to the nominal bias state, when in the third operating mode, applying a second plurality of offset voltages to each biasing system relative to the nominal bias state, providing, with each biasing system, one of the nominal bias state, the first plurality of offset voltages, and the second plurality of offset voltages to a respective radio frequency power amplifier (RFPA) of a plurality of RFPAs, outputting, with each RFPA, an output signal, and combining, at a summing junction, the output signal of each RFPA to generate an output radio frequency (RF) transmitter signal, wherein the second operating mode modifies a harmonic of the output RF transmitter signal relative to the first operating mode, and wherein the third operating mode modifies intermodulation of the output RF transmitter signal relative to the first operating mode.

12. The method of claim 11, wherein:

the first mode is configured for land mobile radio (LMR) transmission efficiency;

the second mode is configured for second harmonics inter-band co-existence; and the third mode is configured for intra-band transmission intermodulation co-existence.

13. The method of claim 11, further comprising:

separating, with a first hybrid coupler coupled to a first input of each RFPA, a phase of each RFPA by 90 degrees.

14. The method of claim 11, further comprising:

detecting an operating frequency of a Long-Term Evolution (LTE) operating band;

controlling, in response to the operating frequency of the LTE operating band being within a non-critical band range, the biasing state of each biasing system for the first operating mode of the communication device;

controlling, in response to the operating frequency of the LTE operating band being within a mid-band range, the biasing state of each biasing system for the second operating mode of the communication device; and controlling, in response to the operating frequency of the LTE operating band being within a low-band range, the biasing state of each biasing system for the third operating mode of the communication device.

15. The method of claim 14, further comprising:

detecting an operating frequency of a land mobile radio (LMR) operating band;

determining, in response to the operating frequency of the LTE operating band being in the mid-band range, whether harmonics of the operating frequency of the LMR operating band are within the mid-band range;

controlling, in response to the harmonics of the operating frequency of the LMR operating band being within the mid-band range, the biasing state of each biasing system for the second operating mode of the communication device; and controlling, in response to the harmonics of the operating frequency of the LMR operating band not being within the mid-band range, the biasing state of each biasing system for the third operating mode of the communication device.

16. The method of claim 14, wherein the mid-band range is a B2 LTE band, a B3 LTE band, or a B39 LTE band, and wherein the low-band range is a B5 LTE band, a B8 LTE band, or a B20 LTE band.

17. The method of claim 11, wherein each biasing system includes one or more tunable resistors, and wherein the method further comprises setting a resistance value of each of the one or more tunable resistors to control the biasing state of each biasing system.

18. The method of claim 11, wherein the plurality of RFPAs includes a first RFPA and a second RFPA, and wherein controlling the first plurality of offset voltages applied to each biasing system for the second operating mode of the communication device includes applying a lower offset voltage to the biasing system for the second RFPA relative to the nominal bias state.

19. The method of claim 11, wherein the plurality of RFPAs includes a first RFPA and a second RFPA, and wherein controlling the second plurality of offset voltages applied to each biasing system for the third operating mode of the communication device includes applying a greater offset voltage to the biasing system for the second RFPA relative to the nominal bias state.

20. The method of claim 11, further comprising:
controlling a third plurality of offset voltages applied to each biasing system relative to the nominal bias state for a fourth operating mode of the communication device, the fourth operating mode modifying a second harmonic of the output RF transmitter signal relative to the first operating mode; and
controlling a fourth plurality of offset voltages applied to each biasing system relative to the nominal bias state for a fifth mode of the communication device, the fifth operating mode modifying second intermodulation of the output RF transmitter signal relative to the first operating mode.

* * * * *